(12) United States Patent
Tosi

(10) Patent No.: US 7,963,028 B2
(45) Date of Patent: Jun. 21, 2011

(54) METHOD AND SYSTEM FOR PRODUCING ALLOY WHEELS FOR MOTOR VEHICLES

(75) Inventor: Roberto Tosi, Crosio Della Valle (IT)

(73) Assignee: IMT Intermato S.p.A., Crosio Della Valle (IT)

( * ) Notice: Subject to any disclaimer, the term of this patent is extended or adjusted under 35 U.S.C. 154(b) by 1118 days.

(21) Appl. No.: 10/581,012

(22) PCT Filed: Nov. 26, 2004

(86) PCT No.: PCT/EP2004/053134
§ 371 (c)(1),
(2), (4) Date: Mar. 19, 2007

(87) PCT Pub. No.: WO2005/051679
PCT Pub. Date: Jun. 9, 2005

(65) Prior Publication Data
US 2007/0277377 A1    Dec. 6, 2007

(30) Foreign Application Priority Data
Nov. 28, 2003    (IT) .............. MI2003A2340

(51) Int. Cl.
*B21K 1/30*       (2006.01)
*B23P 19/00*      (2006.01)
*B23B 7/00*       (2006.01)
*B60B 1/00*       (2006.01)
*G01M 1/00*       (2006.01)

(52) U.S. Cl. .......... 29/802; 29/894; 29/894.35; 29/27 R; 301/5.21; 73/454

(58) Field of Classification Search .............. 29/894, 29/894.3, 894.32, 894.325, 894.35, 27 R, 29/901, 802; 73/66, 462, 466, 459, 460, 73/461; 301/5.21; 700/279; 82/903
See application file for complete search history.

(56) References Cited

U.S. PATENT DOCUMENTS

| | | | | |
|---|---|---|---|---|
| 2,171,927 A * | 9/1939 | Fuchs | ............ | 82/173 |
| 2,346,975 A * | 4/1944 | Laboulais | ............ | 219/69.17 |
| 3,259,730 A * | 7/1966 | Heinz Wehde et al. | ..... | 219/69.17 |
| 3,951,563 A * | 4/1976 | Ravenhall | ............ | 408/1 R |
| 4,028,524 A * | 6/1977 | Moll et al. | ............ | 219/121.69 |
| 4,285,240 A * | 8/1981 | Gold | ............ | 73/462 |
| 4,817,429 A * | 4/1989 | Goebel | ............ | 73/459 |
| 5,492,002 A * | 2/1996 | Higgins et al. | ............ | 73/1.14 |
| 5,591,909 A * | 1/1997 | Rothamel et al. | ............ | 73/462 |
| 5,983,717 A * | 11/1999 | Diez | ............ | 73/462 |
| 6,435,027 B1 * | 8/2002 | Colarelli et al. | ............ | 73/462 |
| 2002/0148276 A1 * | 10/2002 | Goebel | ............ | 73/1.14 |

FOREIGN PATENT DOCUMENTS

| | | |
|---|---|---|
| JP | 05145651 | 12/1994 |
| JP | 08078779 | 10/1996 |
| JP | 2000366705 | 6/2002 |

* cited by examiner

*Primary Examiner* — David P Bryant
*Assistant Examiner* — Alexander P Taousakis
(74) *Attorney, Agent, or Firm* — Day Pitney LLP

(57) ABSTRACT

A method for producing alloy wheels for motor vehicles in which each wheel is provided with a hub and a rim contemplates realizing a finishing operation with a cutting machine tool, measuring the unbalance of the wheel, checking whether the unbalance falls within the predetermined acceptability values by means of a control unit and issuing a signal related to the acceptability of the unbalance.

8 Claims, 3 Drawing Sheets

US 7,963,028 B2

METHOD AND SYSTEM FOR PRODUCING ALLOY WHEELS FOR MOTOR VEHICLES

TECHNICAL FIELD

The present invention concerns a method for producing alloy wheels.

Such a method according to the preamble of claim 1 is known from EP607757.

BACKGROUND ART

Alloy wheels are being increasingly used in the automobile industry to equip both cars and small and medium-sized commercial vehicles and they are particularly appreciated because, besides giving the motor vehicle a particularly attractive appearance, they present mechanical characteristics, such as light weight and rigidity, that are decidedly better with respect to wheels made in the traditional way.

An alloy wheel presents an axle and comprises a hub, a rim, which are situated concentrically around the axle and an intermediate portion, which has the function of connecting the hub to the rim and is made in a very high number of models to give each wheel a distinctive character. Generally, the aforementioned models of the intermediate portion can be classified in a first family, according to which the hub and the rim are connected by a plurality of spokes, and in a second family, according to which the hub and the rim are connected by a perforated plate. Moreover, alloy wheels are made both in a single piece, that is the hub, the rim and the intermediate portion are formed of a single piece obtained by casting or by forging, and in a number of pieces, generally two, that is the hub, a part of the rim and the intermediate portion are made in a first piece obtained by casting or forging, while a further part of the rim is made separately, also by casting or forging, in a second piece, which is later assembled with the first piece. The alloy wheel formed of several pieces is usually defined as being of compound type.

In both cases, the realisation of an alloy wheel contemplates a procedure of casting an alloy of aluminium or magnesium to make an untreated wheel or the pieces that make up the wheel, a heat treatment and a first and a second machining with a turning lathe. As an alternative to casting, the wheel is forged and, afterwards, subjected to heat treatment. The machining operations have the function of realising finished surfaces with high degrees of tolerance along the rim to guarantee a perfect coupling with the tyre and at the hub in the coupling area with the end part of an axle or of a semi-axle of a motor vehicle. The machining also has the function of eliminating burrs and of correcting any imprecisions derived from the previous operations. In other words, the untreated wheel presents eccentric masses which must be removed in such a way that the finished wheel, in use, is as balanced as possible in rotation around its own axis so as not to transmit vibrations to the motor vehicle.

Whereas said result was once accepted as satisfactory by the automobile industry, car manufacturers are now beginning to demand decidedly higher levels of balancing in alloy wheels since car manufacturers are, on the one hand, obliged to reduce the lead weights used for balancing wheels for environmental reasons and, on the other hand, to offer ever higher levels of comfort.

According to a method for producing alloy wheels for motor vehicles disclosed in patent application EP 607,757, the alloy wheels are realised and finished with a cutting machine tool. In particular, the above identified method comprises the steps of measuring the unbalance of said wheel, checking whether said unbalance is lower than an unbalance acceptability value by means of a control unit; calculating a mass to be removed and the respective phase with respect to a determined point on the wheel; said unbalance being identified by said mass and by said phase. The identified mass is removed by the cutting machine tool by offsetting the centre axis of the wheel.

Even though, the above method is a step forward in balancing the alloy wheel and allows reducing the lead applied to the outer side rim, it cannot solve completely the problem set forth above. In fact, EP 607,757 the dynamic unbalance is poorly compensate by machining the wheel by offsetting the axis of the wheel. From DE 24,55,279 it is known a method for balancing the wheel with a mounted tyre by deforming the rim of the wheel. This technique is applicable solely to wheel made of malleable material such as deep drawn metal sheet.

DISCLOSURE OF INVENTION

The aim of the present invention is to provide a method for producing alloy wheels which is able to achieve balancing levels decidedly superior to those that can be obtained with the known methods without substantially increasing the production costs.

According to the present invention a method is supplied for producing alloy wheels according to claim 1.

The present invention concerns a system for producing alloy wheels for motor vehicles.

According to the present invention a system is realised for producing alloy wheels for motor vehicles according to claim 10.

BRIEF DESCRIPTION OF THE DRAWINGS

For a better understanding of the present invention, a preferred embodiment will now be described, purely as an example without limitation, with reference to the enclosed figures, in which.

BEST MODE FOR CARRYING OUT THE INVENTION

Figure 1:
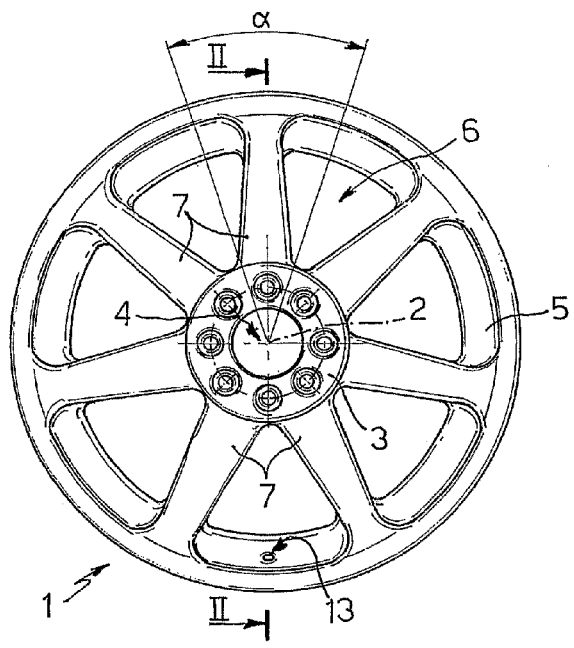
FIG. 1 is a front elevation view on a reduced scale of a light alloy wheel.
Figure 2:
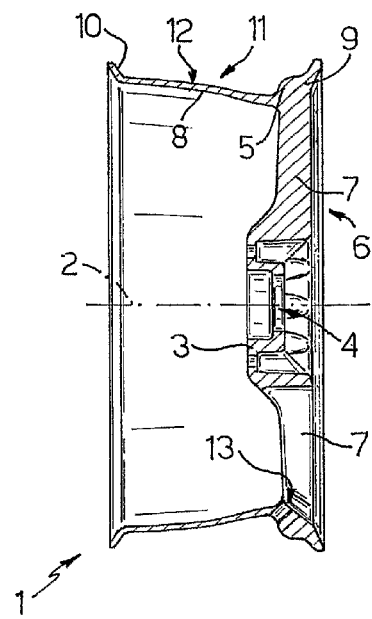
FIG. 2 is a view of a section of the wheel in FIG. 1 along the section lines II-II.

With reference to FIGS. 1 and 2, the reference 1 indicates overall a substantially finished wheel, that is obtained by means of known processes of casting a metal alloy or of forging, subsequently subjected to heat treatment and machining. The wheel 1 comprises an axle 2 around which extend a hub 3 with a central hole 4, a rim 5 suited to house a tyre, not illustrated in the enclosed figures, and an intermediate portion 6 which in the illustrated example is defined by seven spokes 7, which are uniformly distributed around the axle 2 and connect the hub 3 to the rim 5. In the example illustrated in the enclosed figures reference is made to a wheel 1 made all in one piece with an intermediate portion 6 defined by seven spokes 7; of course the present invention extends to any type of wheel, in one piece or compound, and to any type of intermediate portion.

Figure 3:
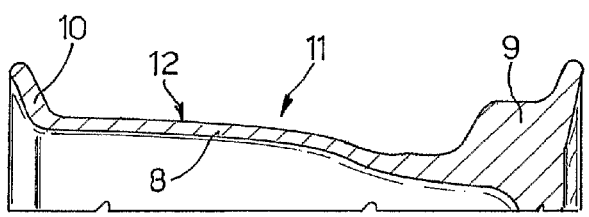
FIG. 3 is a view on an enlarged scale of a detail of the wheel in FIG. 2.

As better illustrated in FIG. 3, the rim 5 presents a substantially cylindrical wall 8 laterally delimited by two annular edges 9 and 10, which together with the wall 8 define a channel 11 suited to contain a tyre not illustrated in the enclosed figures. The wall 8 presents a face 12 facing towards the outside and along which will be performed the interventions for balancing the wheel 1. Moreover, (FIGS. 1 and 2) the wall 8 is crossed by a hole 13, which is suited to house the valve of the tyre, not illustrated in the enclosed figures.

In brief, the method according to the present invention contemplates determining the unbalance of the wheel 1 by the phases of measuring the unbalance and of checking the acceptability of the unbalance. If the unbalance does not fall within parameters considered acceptable, then the method calculates the coordinates of a mass to be removed and removes the mass by machining.

Figure 5:
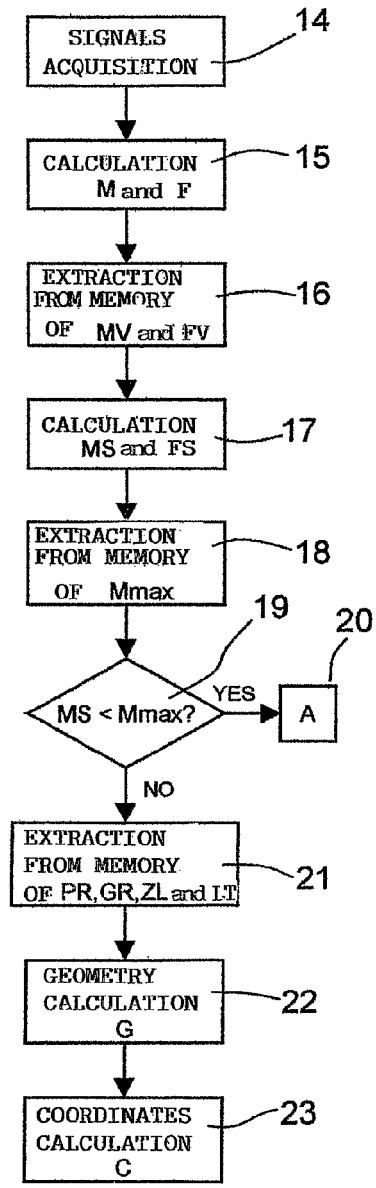
FIG. 5 is a view of a block diagram which sums up the phases of the method to which the present invention refers.

With reference to FIG. 5, in the acquisition block 14 characteristic signals of unbalance are acquired, while in the calculation block 15 the mass M and the phase F of the unbalance are calculated. The mass M represents the mass to be removed to balance the wheel, while the phase F is the angular reference, from which the mass M must be removed, with respect to a determined point of reference of the wheel 1. In the block 16, the mass of the valve MV (which will be installed on the wheel 1) and the phase of the valve FV with respect to the determined point are extracted from a memory not illustrated. In the block 17, a simulation is made of the unbalance in working conditions of the wheel 1 as though the valve were fitted on the wheel 1 and the simulated mass MS to be removed and the relative simulated phase FS are calculated. In the block 18, a value $M_{max}$ of the maximum acceptable unbalance is extracted from the memory and in the block 19 it is checked whether the mass MS is lower than the value $M_{max}$. If this condition is found, in the block 20 a signal of acceptability A of the wheel 1 is given. If, on the contrary, the condition of block 19 is not found, then it is necessary to remove the mass MS from the wheel 1. For this purpose the following data are extracted from the memory in the block 21; specific weight PR of the material of the wheel 1, the geometry GR of the wheel 1, the allowed zones of removal ZL and the type of machining LT chosen for removing the mass MS.

In the block 22, the geometry G of the mass MS to be removed is calculated, while in the block 23 the coordinates C of the geometry G are calculated with respect to a point of reference.

Figure 4:
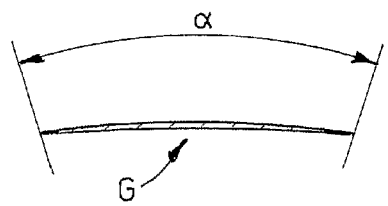
FIG. 4 is a schematic view of a geometric representation of the mass to be removed from the wheel in FIG. 1.

In order to avoid unattractive machining on the wheel 1, the geometry G of the mass MS is distributed along a relatively large angle α, as illustrated in FIG. 1 and in FIG. 4 which represents an example of the geometry G of the mass MS to be removed from the wheel 1. The coordinates C are transferred to a cutting machine tool with numerical control which removes the mass MS from the wheel 1.

The method described contemplates different possibilities of implementation. The first consists of carrying out the finishing operation on a cutting machine tool, checking the unbalance and if necessary calculating the coordinates C of the mass MS to be removed in order to correct the unbalance on a machine for measuring unbalance, and correcting the unbalance on a cutting machine tool. The second possible implementation lies in the fact that the finishing operation, checking and possible calculation of the coordinates C are carried out on the same cutting machine tool, while the correction of unbalance is carried out on another cutting machine tool. Lastly, the third possible implementation is certainly the most advantageous because the finishing, the determination of the unbalance and the correction of the unbalance are all carried out on a single cutting machine tool.

Figure 6:
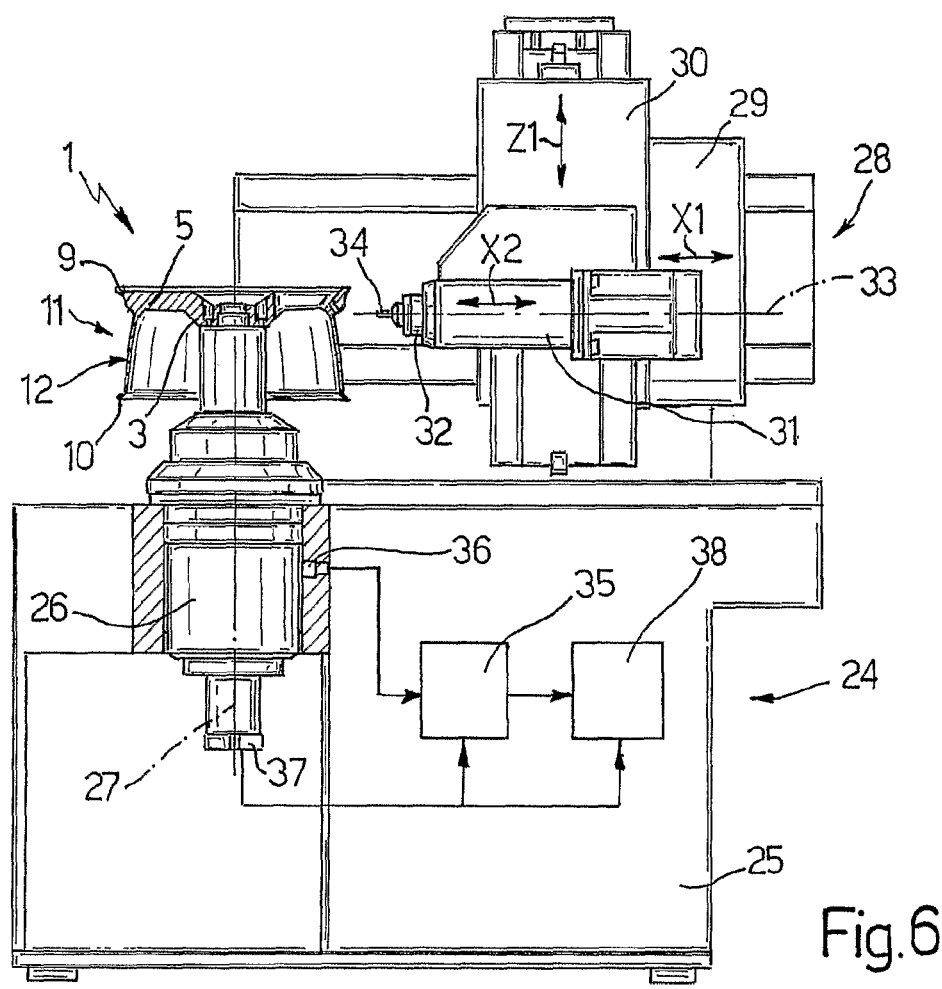
FIG. 6 is a schematic view of a side elevation of a cutting machine tool for machining the wheel in FIG. 1, realised according to the present invention.

With reference to FIG. 6, a cutting machine tool 24 is illustrated which is suited to operate according to the method described for finishing, checking the unbalance and eventually correcting the unbalance in a single machine.

The machine tool 24 comprises a base 25, which supports a piece holding chuck 26, which is motor-driven and rotates around an axle 27, and a frame 28, which supports a slide 29 moving along a horizontal axis X1 with respect to the frame 28, a slide 30 moving along a vertical axis Z1 with respect to the slide 29, a third slide 31 moving along a horizontal axis X2 with respect to the slide 30. The slide 31 supports a motor-driven chuck 32 rotating around a horizontal axis 33 and suited to support a tool 34. Substantially, the machine tool 24 is able to carry out milling and turning operations, or both processes simultaneously. The machine tool 24 also comprises a control unit 35, sensors 36 for detecting static unbalance (accelerometers or velocimeters), sensors 37 for detecting the angular position (encoder) of the chuck 26 and a numerical control 38. The control unit 25 carries out all the operations described in the block diagram in the figure and transfers the coordinates C to the numerical control 38 which controls the shifting of the tool 34 according to the angular shifting of the wheel 1.

Figure 8:
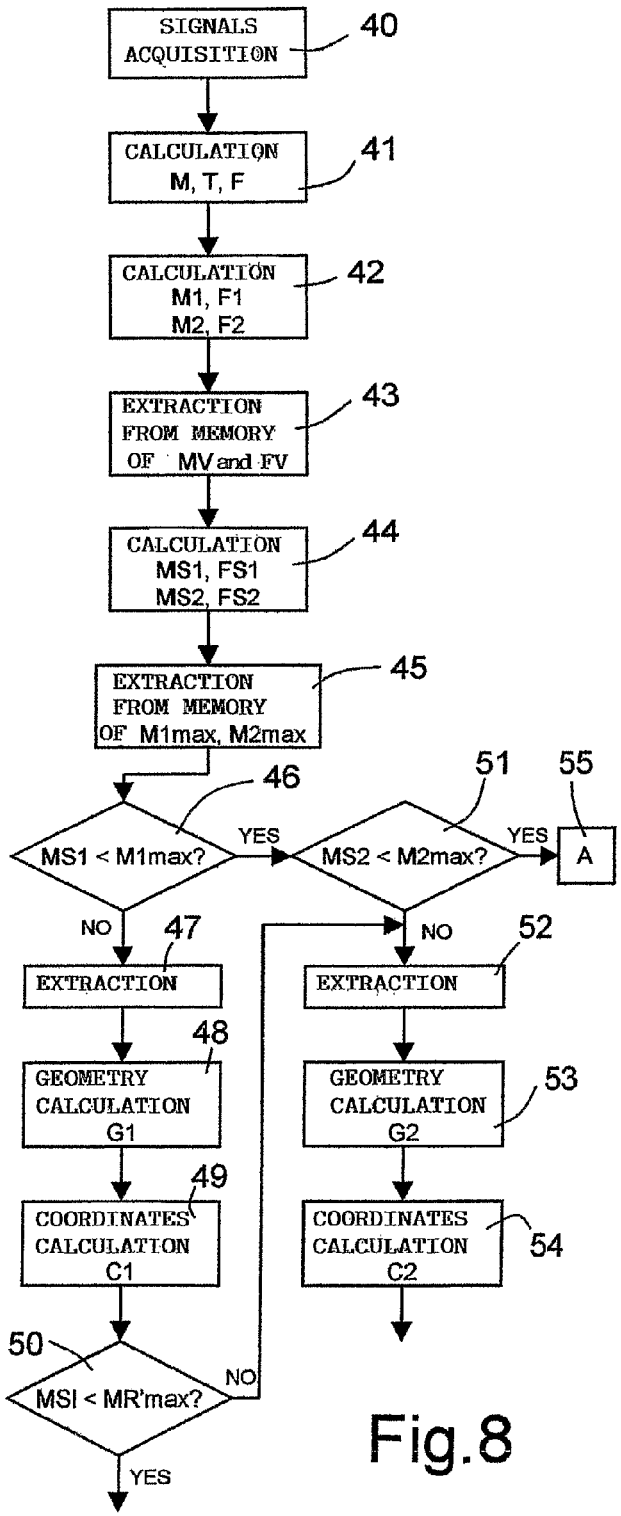
FIG. 8 is a variation of the block diagram in FIG. 5.
Figure 7:
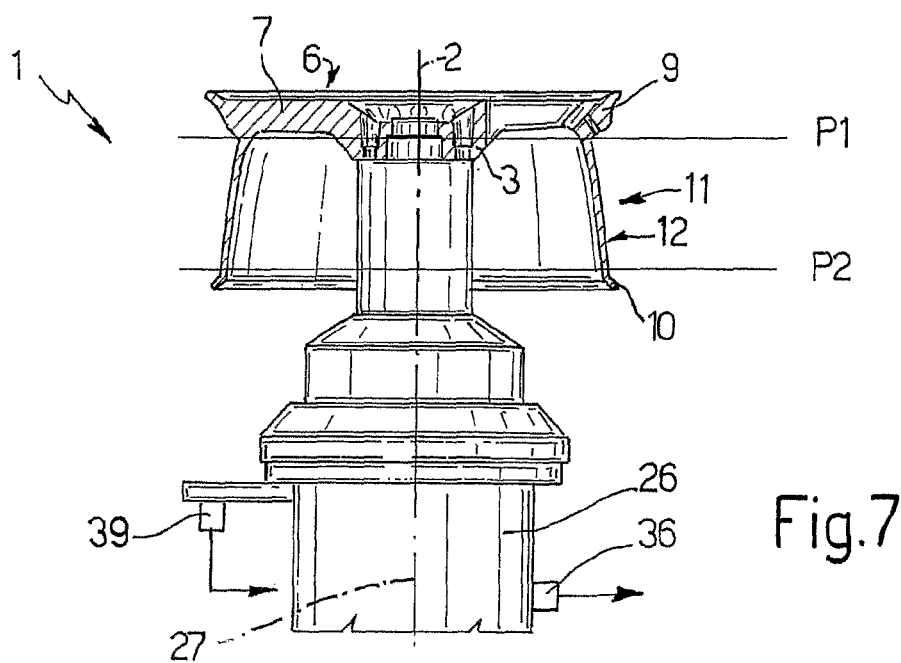
FIG. 7 is a view on an enlarged scale of a detail of the machine in FIG. 6 according to a variation of the present invention.

With reference to FIG. 7, the machine tool 24 is equipped with further sensors 39 (piezoelectric sensors, load cells, accelerometers) suited to detect the dynamic unbalance, that is the torque T on the chuck 26 exerted by the mass M. The block diagram in FIG. 8 concerns the operating method of the variation in FIG. 7. This method differs from the previous one by the fact that it contemplates the removal of material from the wheel 1 on two horizontal planes P1 and P2 intersecting the wheel 1 respectively near the edge 9 and the edge 10 (FIG. 7). With reference to FIG. 8, a block 40 is shown for acquiring signals by means of the sensors 36, 37 and 39, a block 41 for calculating the values M, T and F, a block for calculating the mass M1 and the phase F1 for the plane P1 (FIG. 7) and the mass M2 and the phase F2 for the plane P2 (FIG. 7); then in the block 43 the values of the mass of the valve MV and of the phase of the valve FV are extracted and in block 44 the mass MS with the respective phase FS1 and the mass MS2 with the respective phase FS2 are calculated as resulting from the simulation of valve presence. In the block 45 the acceptability values $M1_{max}$ and $M2_{max}$ are extracted from the memory and are compared respectively with the values of MS1 and of MS2 in the blocks 46, 50 and 51. If the masses MS1 and MS2 are both lower than $M1_{max}$ and $M2_{max}$ (see blocks 46, 51) the block 50 gives an unbalance acceptance signal A. If the masses MS1 and MS2 are not respectively lower than $M1_{max}$ and $M2_{max}$, then in a similar way to that described for the blocks from 21 to 23 in FIG. 5, the geometry G1 and the coordinates C1 of the mass MS1 are calculated (blocks 47, 48 and 49), and the geometry G2 and the coordinates C2 of the mass MS2 (blocks 52, 53 and 54). The blocks 47 and 52 are equivalents of the block 21 in FIG. 5. If only one of the conditions has not occurred, then only the coordinates C1 or the coordinates C2 are calculated. The coordinates thus calculated are transmitted to the numerical control 38 (FIG. 6) of the machine tool 24 which carries out the machining to balance the wheel 1.

The invention claimed is:

1. A system for producing alloy wheels for motor vehicles, each wheel comprising a hub and a rim;
the system comprising:
a vertical lathe, which is configured for carrying out a machining finishing operation; and
a control unit configured for:
detecting an unbalance of said wheel;
checking whether said unbalance falls within an unbalance acceptability value; and
calculating a first simulated mass and a second simulated mass to be removed and a respective first simulated phase and second simulated phase with respect to a determined point on the wheel and as function of a mass of a valve and a phase of the valve;
said unbalance being identified by the first and second simulated masses and by the first and second simulated phases;
wherein the first and second simulated masses are separated from each other along the axle of the wheel.

2. The system of claim 1, wherein the vertical lathe is configured for checking the first and second simulated masses of the unbalance acceptability with respect to a first unbalance acceptability value and a second unbalance acceptability value.

3. The system of claim 1, wherein the vertical lathe is configured for removing said simulated masses from said wheel to compensate for the unbalance, when at least one of the first and the second masses is not lower than the respective first and second unbalance acceptability values.

4. The system of claim 3, wherein the vertical lathe comprises sensors for detecting the unbalance;
the control unit being configured for calculating a first coordinate and a second coordinate for said respective said first and second simulated masses; and
the vertical lathe further comprises a numerical control configured to acquire said coordinates, and being configured to carry out the machining finishing operation, to check the unbalance and remove the first and second simulated masses.

5. The system of claim 3, wherein the vertical lathe comprises sensors for dynamically detecting the unbalance and means for calculating the first and second masses in correspondence of a first plane and a second plane along an axis of said wheel.

6. The system of claim 3, wherein the control unit is configured for calculating the first and second simulated masses as function of the first and second masses and the first and second phases and the mass of the valve and the phase of the valve.

7. The system of claim 3, wherein the control unit is configured for calculating a first geometry and a second geometry of the respective first and second simulated masses as a function of a geometry of the wheel and a specific weight of the wheel.

8. The system of claim 7, wherein the control unit is configured for determining the first and second coordinates of said first and second geometries with respect to a point of reference on the wheel.

* * * * *